(12) United States Patent
Landers et al.

(10) Patent No.: US 11,349,994 B2
(45) Date of Patent: *May 31, 2022

(54) AUTOMATED COMMUNICATIONS RESPONSE SYSTEM

(71) Applicant: Eolas Technologies Inc., Tyler, TX (US)

(72) Inventors: Steven Carl Landers, Mount Claremont (AU); Michael D. Doyle, Glen Ellyn, IL (US)

(73) Assignee: Eolas Technologies Inc., Tyler, TX (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/017,152

(22) Filed: Jun. 25, 2018

(65) Prior Publication Data

US 2018/0309878 A1    Oct. 25, 2018

Related U.S. Application Data

(63) Continuation of application No. 14/796,538, filed on Jul. 10, 2015, now Pat. No. 10,015,318, which is a
(Continued)

(51) Int. Cl.
*G06F 15/16* (2006.01)
*H04M 7/00* (2006.01)
(Continued)

(52) U.S. Cl.
CPC ...... *H04M 7/0015* (2013.01); *H04L 12/1827* (2013.01); *H04L 51/046* (2013.01);
(Continued)

(58) Field of Classification Search
CPC ............. H04M 7/0015; H04M 7/0063; H04M 3/42161; H04M 1/64; H04W 88/02;
(Continued)

(56) References Cited

U.S. PATENT DOCUMENTS 5,283,856 A    2/1994 Gross et al.
6,718,367 B1    4/2004 Ayyadurai
(Continued)

OTHER PUBLICATIONS

A simple version of Eliza, retrieved from the Internet at http://wiki.tcl.tk/9235, on Sep. 21, 2017 (4 pages).
(Continued)

*Primary Examiner* — Suraj M Joshi
*Assistant Examiner* — Jaren Means
(74) *Attorney, Agent, or Firm* — Neal, Gerber & Eisenberg LLP

(57) ABSTRACT

In one embodiment, a system provides for end-user control over the automatic recognition of communication situations by detection of unique telecommunication event characteristics and the consequential responses to those situations by invocation of related programmatic responses. The system allows an end user to specify various patterns of telecommunication event characteristics that describe various situational aspects of incoming communications, such as the timing and originator of voice calls, the content of, timing of, and author of chat messages, etc., as well as appropriate sets of programmatic response actions to be performed in response to those communications, such as initiating conference calls, sending chat messages, routing calls to other users, etc. The system monitors incoming communications, matches characteristic patterns to recognize the situations, and then invokes the matching response actions, thereby automating many functions of the communication system that previously would have had to be performed manually.

37 Claims, 10 Drawing Sheets

Related U.S. Application Data continuation of application No. 12/854,842, filed on Aug. 11, 2010, now Pat. No. 9,100,465.

(60) Provisional application No. 61/273,952, filed on Aug. 11, 2009.

(51) Int. Cl.

| | | |
|---|---|---|
| *H04L 12/18* | (2006.01) | |
| *H04M 1/64* | (2006.01) | |
| *H04M 3/42* | (2006.01) | |
| *H04L 65/1063* | (2022.01) | |
| *H04L 65/1069* | (2022.01) | |
| *H04L 51/046* | (2022.01) | |
| *H04L 51/56* | (2022.01) | |
| *H04W 88/02* | (2009.01) | |

(52) U.S. Cl.
CPC .......... *H04L 51/36* (2013.01); *H04L 65/1063* (2013.01); *H04L 65/1069* (2013.01); *H04M 1/64* (2013.01); *H04M 3/42161* (2013.01); *H04M 7/0063* (2013.01); *H04W 88/02* (2013.01)

(58) Field of Classification Search
CPC ................ H04L 51/36; H04L 51/046; H04L 65/1069; H04L 65/1063; H04L 12/1827
See application file for complete search history.

(56) References Cited

U.S. PATENT DOCUMENTS

| | | | |
|---|---|---|---|
| 6,718,368 | B1 | 4/2004 | Ayyadurai |
| 6,807,423 | B1* | 10/2004 | Armstrong .......... H04L 12/1813 370/328 |
| 2004/0111479 | A1* | 6/2004 | Borden .............. H04L 12/1813 709/206 |
| 2005/0063365 | A1* | 3/2005 | Mathew .................. H04L 51/12 370/352 |
| 2005/0287994 | A1 | 12/2005 | Serafat et al. |
| 2006/0277474 | A1* | 12/2006 | Robarts ................. G06Q 10/10 715/745 |
| 2008/0189367 | A1* | 8/2008 | Okumura ............... H04L 51/02 709/204 |
| 2009/0064323 | A1 | 3/2009 | Lin |
| 2011/0035453 | A1* | 2/2011 | Koul .................... G06Q 10/107 709/206 |
| 2018/0278554 | A1* | 9/2018 | Kassabgi ............... G16H 10/20 |

OTHER PUBLICATIONS

ELIZA—A Computer Program for the Study of Natural Language Communication Between Man and Machine, Joseph Weizenbaum, Communications of the ACM, vol. 9, No. 1, Jan. 1966 (10 pages).
G5AIAI—Introduction to Artificial Intelligence, Eliza retrieved from the Internet at http:/ /www.cs.nott.ac.uk/~pszgxk/courses/g5aiai/002history/eliza.htm, on Sep. 21, 2017 (3 pages).
Wikipedia's Definition of "ELIZA" as shown in Wikipedia's Online free encyclopedia, retrieved from the Internet at https:/ /en.m.wikipedia.org/wiki/ELIZA on Sep. 21, 2017 (10 pages).

\* cited by examiner

Rules for voice calls

| Enable | Who | When | Where | Event | Type | Action | Details |
|---|---|---|---|---|---|---|---|
| ✓ | all | night | home | ringing | in | refuse | Don't want to be disturbed at night |
| ✓ | all | away | | ringing | in | voicemail | No point if I'm not there |
| ✓ | all | | | connect | in | log | Accepted call from $Partner to $Location |
| ✓ | all | | | finish | in | log | Accepted call from $Partner to $Location |
| ✓ | all | | | finish | out | log | Call terminated after $Duration seconds |
| ✓ | $me | | | connect | out | log | Called $Partner from $Location |
| ✓ | $me | morning | office | ringing | in | reply | I'm in a meeting |
| ✓ | $me | afternoon | office | ringing | in | reply | I'm in a meeting |
| ✓ | $me | evening | office | ringing | in | reply | I'm available via chat |
| ✓ | friends | | | ringing | in | refuse | No way, lose |
| | friends | worktime | | ringing | in | voicemail | |

FIG. 2

| Calls | Chats | Watch | ⊙ Groups | Time | Locations | Actions | Names | Types | Skype |

Times

| When | Days | Start | End | Status |
|---|---|---|---|---|
| away | | | | offline |
| morning | | 0600 | 1159 | |
| lunch | | 1200 | 1300 | |
| afternoon | | 1200 | 1800 | |
| evening | | 1800 | 2359 | |
| night | | 1800 | 0600 | |
| worktime | Mon-Fri | 0800 | 1800 | |
| offpeak | | 0000 | 0800 | |
| idle | Mon-Fri | 0800 | 1800 | inactive |
| sleep | | 2200 | 0700 | offline |

FIG. 3

Overview

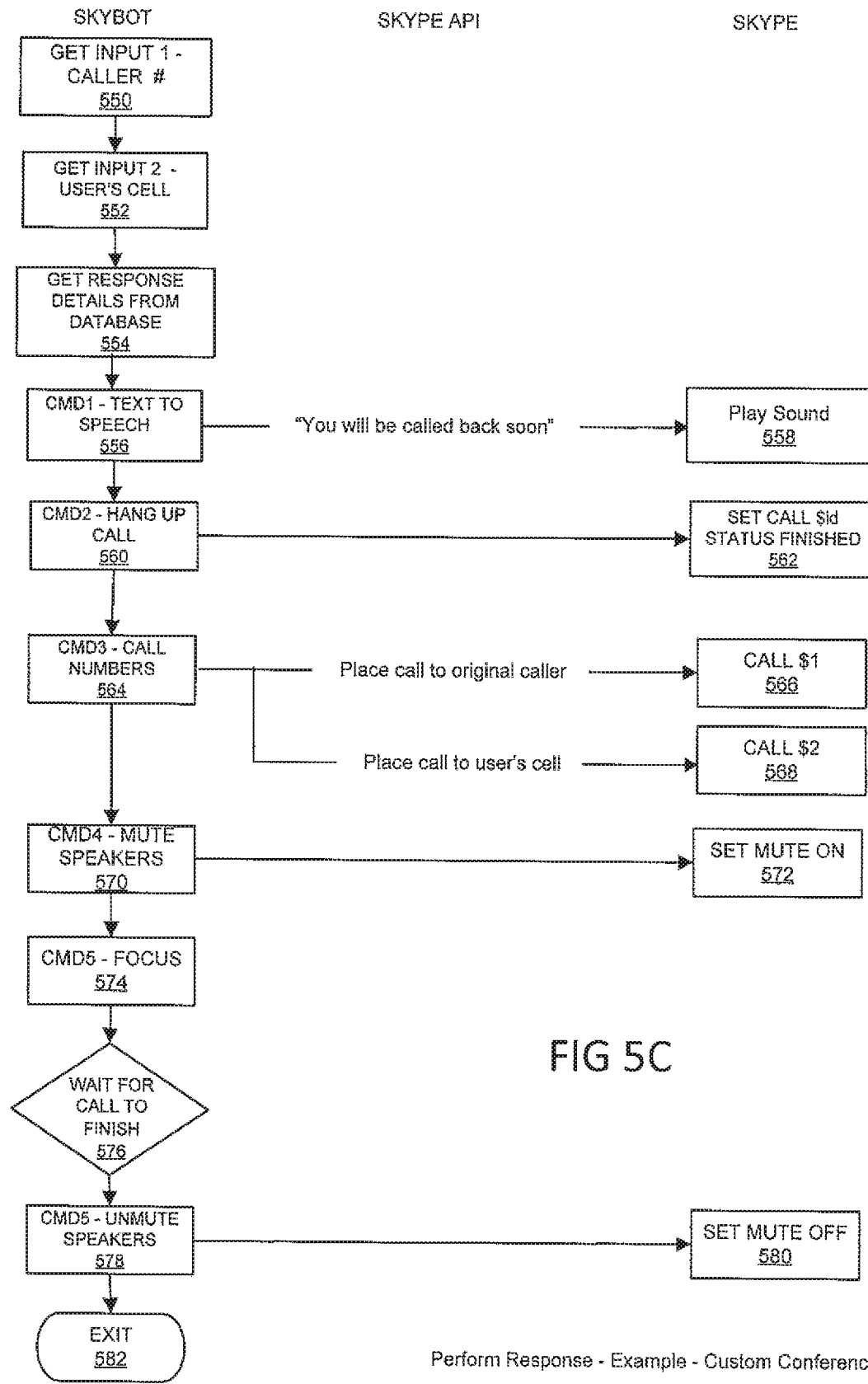

| Skybot rulez! | | | | | | | | | | □ □ × |
|---|---|---|---|---|---|---|---|---|---|---|
| Calls | Chats | Watch | ◯ Groups | Time | Locations | Actions | Names | Types | Skype | |

Variable types – only in Skybot Pro

| Type | Match | Reformat | Description |
|---|---|---|---|
| email | email $value | yes | text of the form "user@host.domain |
| file | file normalize $value | yes | a file on the local host (using the T cl file convent |
| user | expr {[string is alnum value] && [string length $value] >=6} | | a Skype user name |
| phone | phone $value | yes | international (11 digit) phone number |
| skype | info exists skype::$value | | a Skype variable (as per Skype API docs) |
| text | | | arbitrary textual value |
| uri | uri $value http | yes | general URI e.g. file://wwww.whatever.com |
| website | | yes | a web url e.g. http://wwww.whatever.com |

FIG. 7

AUTOMATED COMMUNICATIONS RESPONSE SYSTEM

RELATED APPLICATIONS

This application is a continuation of, claims priority to and the benefit of U.S. patent application Ser. No. 14/796,538, filed on Jul. 10, 2015, which application is a continuation of, claims priority to and the benefit of U.S. patent application Ser. No. 12/854,842, filed on Aug. 11, 2010, which is now U.S. Pat. No. 9,100,465, issued on Aug. 4, 2015, which claims priority to and the benefit of U.S. Provisional Patent Application No. 61/273,952, filed on Aug. 11, 2009, the entire contents of which are each incorporated by reference herein.

TECHNICAL FIELD

The present disclosure relates generally to controlling and managing VOIP and Instant Messaging (IM) applications.

BACKGROUND OF THE INVENTION

Skype is a software system that allows users to make audio and video calls over the Internet. It supports conference calls, instant messaging, file transfer and video conferencing. Skype uses a proprietary Internet telecommunication (VoIP) network that works on a peer-to-peer model.

Skype includes an Application Programming Interface (API) that allows other programs to interact with Skype. The Skype API supports three types of messages: 1) commands to control Skype, 2) directives—i.e. "out of band" commands that control the API itself, and 3) information messages that Skype sends about its status.

One of Skype's distinguishing features is that it can operate behind firewalls and Name Address Translation (NAT) routers. It achieves this by using super-nodes to relay calls between clients not directly connected to the Internet. Any Skype client can become a super-node if it connects to the Internet without NAT and/or an appropriate firewall, which means Skype can and does "borrow" bandwidth and computing power.

A disadvantage of such a "borrowing" feature is that the end-user has little control over the conditions or timing of such borrowing. Despite the existence of APIs to provide developers with programmability of such systems, tools are not available that enable end-users to take control of the telephony and chat facilities in a way that they can automate their various functions to allow end-user control of such features as the borrowing described above, or to allow automatic detection of and response to a variety of other telecommunications circumstances that might arise.

What is needed is a system that enables the end-user to simply and precisely define a set of telecommunications circumstances, such as any set of characteristics which apply to particular classes of voice calls or chat messages, and to define appropriate programmatic responses to relevant circumstances, to allow automatic detection of and response to a wide variety of such telecommunications circumstances, thereby expanding the usefulness of telecommunications systems.

BRIEF DESCRIPTION OF THE DRAWINGS

FIG. 2 depicts an example embodiment of a spreadsheet-type interface for defining call rules;

FIG. 3 depicts an example embodiment of a spreadsheet-type interface for defining times;

FIGS. 5A-C are flow charts illustrating the operation of an example embodiment;

FIG. 7 depicts an example embodiment of a spreadsheet-type interface for defining types.

DESCRIPTION OF EXAMPLE EMBODIMENTS

Overview

An example embodiment provides a system for end-user control over the automatic recognition of communication situations by detection of unique telecommunication event characteristics and the consequential responses to those situations by invocation of related programmatic responses. The system allows an end user to specify various patterns of telecommunication event characteristics that describe various situational aspects of incoming communications, such as the timing and originator of voice calls, the content of, timing of, and author of chat messages, etc., as well as appropriate sets of programmatic response actions to be performed in response to those communications, such as initiating conference calls, sending chat messages, routing calls to other users, etc. The system monitors incoming communications, matches characteristic patterns to recognize the situations, and then invokes the matching response actions, thereby automating many functions of the communication system that previously would have had to be performed manually.

DESCRIPTION

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, various embodiments may be practiced without some or all of these specific details. In other instances, well known process operations have not been described in detail in order not to unnecessarily obscure the present invention. Further, each appearance of the phrase an "example embodiment" at various places in the specification does not necessarily refer to the same example embodiment.

Figure 1:
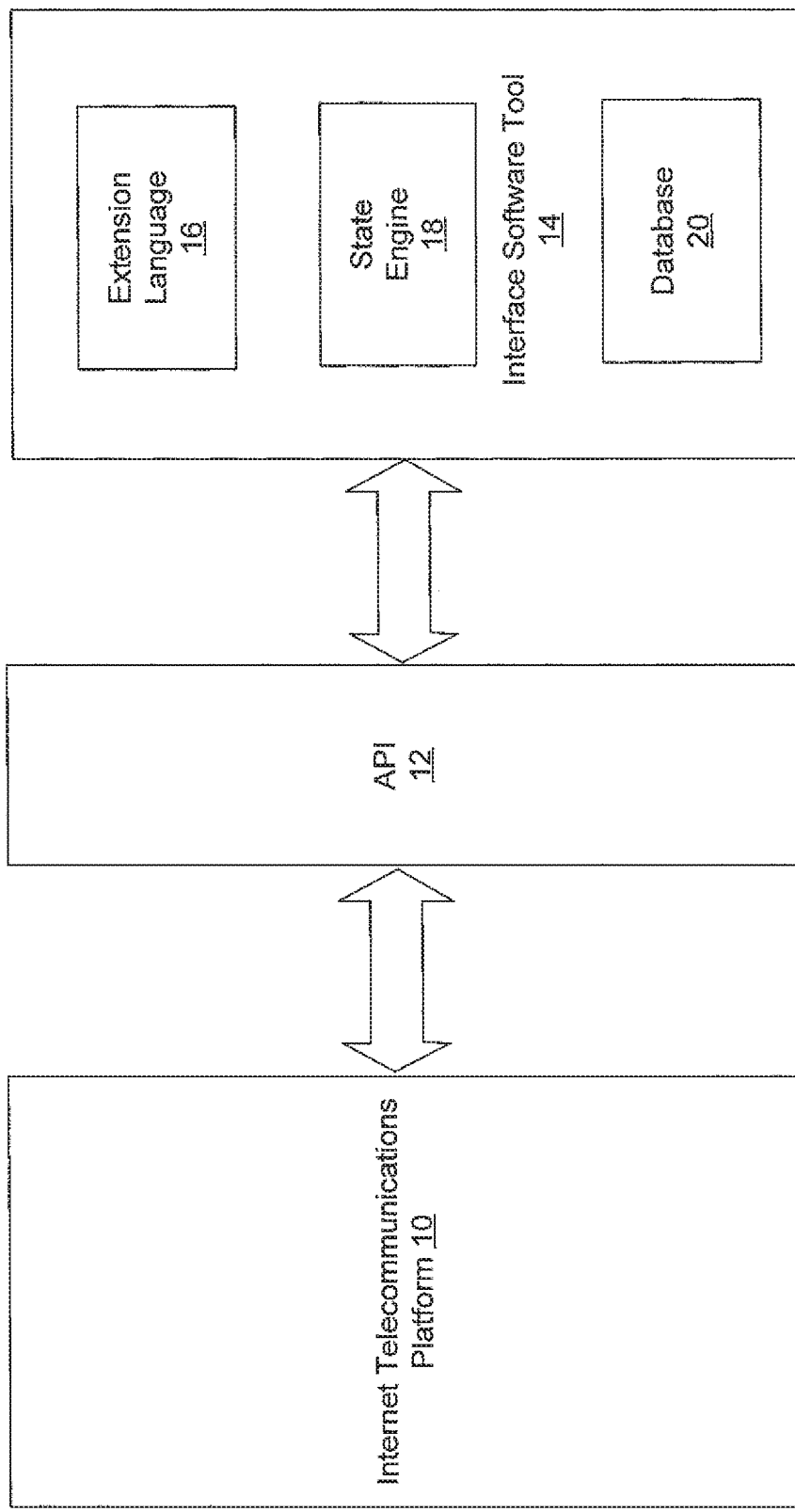
FIG. 1 is a block diagram of an example embodiment.

A first example embodiment is an interface software tool, named "Skybot", as depicted in FIG. 1, and is programmed utilizing the Tool Command Language (Tcl). Referring to FIG. 1, in this example embodiment an Internet telecommunication platform 10, the Internet telecommunication platform API 12 and the Interface Software Tool 14 are implemented as software modules on a user's personal computer (PC).

The Interface Software Tool 14 includes an extension language module 16 used to specify rules and actions for interacting with an Internet telecommunication platform, a generalized state engine 18 that evaluates the rules and automatically triggers Tcl code in response to various events, a database 20 for holding rules and an interface (not shown) to the API of the Internet telecommunication platform so that actions can access state and configuration information of the Internet telecommunication platform. In this example embodiment the Internet telecommunication platform is Skype.

In this example embodiment the rules are stored in a normalized database, and presented to users as tables. There is a single maintenance screen with multiple tabs—one for each table in the database.

There are three classes of rules: 1) call rules, 2) chat rules, and 3) watch rules (watch for someone changing to a particular status) used in this example embodiment.

FIG. 2 depicts an example embodiment of a spreadsheet-type interface for defining call rules. The interface includes a set of tabs entitled Calls, Chats, Watch, Groups, Time, Locations, Actions, Names, Types and Skype. In FIG. 2 the Calls tab has been selected. The Call interface is a grid with a row for each rule and columns defining characteristics of each rule. In this example the characteristics of a voice call rule include: Enable, Who, When, Where, Event, Type, Action and Details. These characteristics will now be described.

The interface includes a button for each characteristic. When creating a new rule using the interface the button for the characteristic is clicked on and the user selects a characteristic that has either been previously pre-specified or specified by the user. The specification of characteristics will be further described below.

The first thing to note is that rules may be defined but not enabled. This makes it easier to create rules without affecting the behavior of the interface software tool.

Turning now to the first rule, which specifies that Skype should not accept calls at night when the user is at home. In this example the Enable characteristic is activated by checking the box under the Enable label. With regard to the rest of the characteristics, note the following:

Who (i.e. "all") is defined in the "Groups" tab, where users and groups are defined—the icon next to "all" signifies a group rather than an individual When (i.e. "night") occurs in the "Time" tab Where (i.e. "home") occurs in the "Location" tab Event (i.e. "ringing") corresponds to the Skype event of the same name Type (i.e. "in") refers to the direction of the call—either in or out.

Action (i.e. "refuse") is defined in the Action tab

The Details column is a descriptive comment that can be used in the rule definition.

In this example embodiment all rules and actions are stored as data in tables, and are abstracted and normalized.

The Who characteristic is defined in the "Groups" tab. In this example embodiment there are two groups defined by default: the all group, which is a wild card that matches all Skype users and a friends group, which is the list of people on the user's Skype contact list (as returned by the Skype API call "SEARCH FRIENDS").

Alternatively, a Skype user name or a pattern (e.g. "corporate-*") can be entered or a groupings to be entered can be specified—for example "wheaton" might expand to "cyndy maury mike". Groups can be recursive, as in wheaton="cyndy maury mike" or corporate="wheaton steveh stevel".

This scheme also allows convenient aliases to map to real Skype user names—for example, the above names might be aliased to corporate-cyndy, corporate-maury and so on. During data entry, a check is performed to ensure a group is not defined with the same name as an alias or a Skype name on the users contact list.

FIG. 3 depicts an example embodiment of a spreadsheet-type interface for defining times. In FIG. 3 the "Time" tab is selected. When specifying time, one can pick from a pre-defined list of time definitions. The "Time" tab allows the addition of new time definitions or editing the existing ones. Time definitions can be based on time ranges, on the current status or both. Days can be a list (space or comma separated), or a range "Mon-Fri" or "Monday-Friday".

Locations are based on IP address, and are defined in the "Locations" tab. The interface software tool recognizes a new location and pops up a dialog so the user can give it a name (e.g. Home, Office, etc.).

Figure 4:
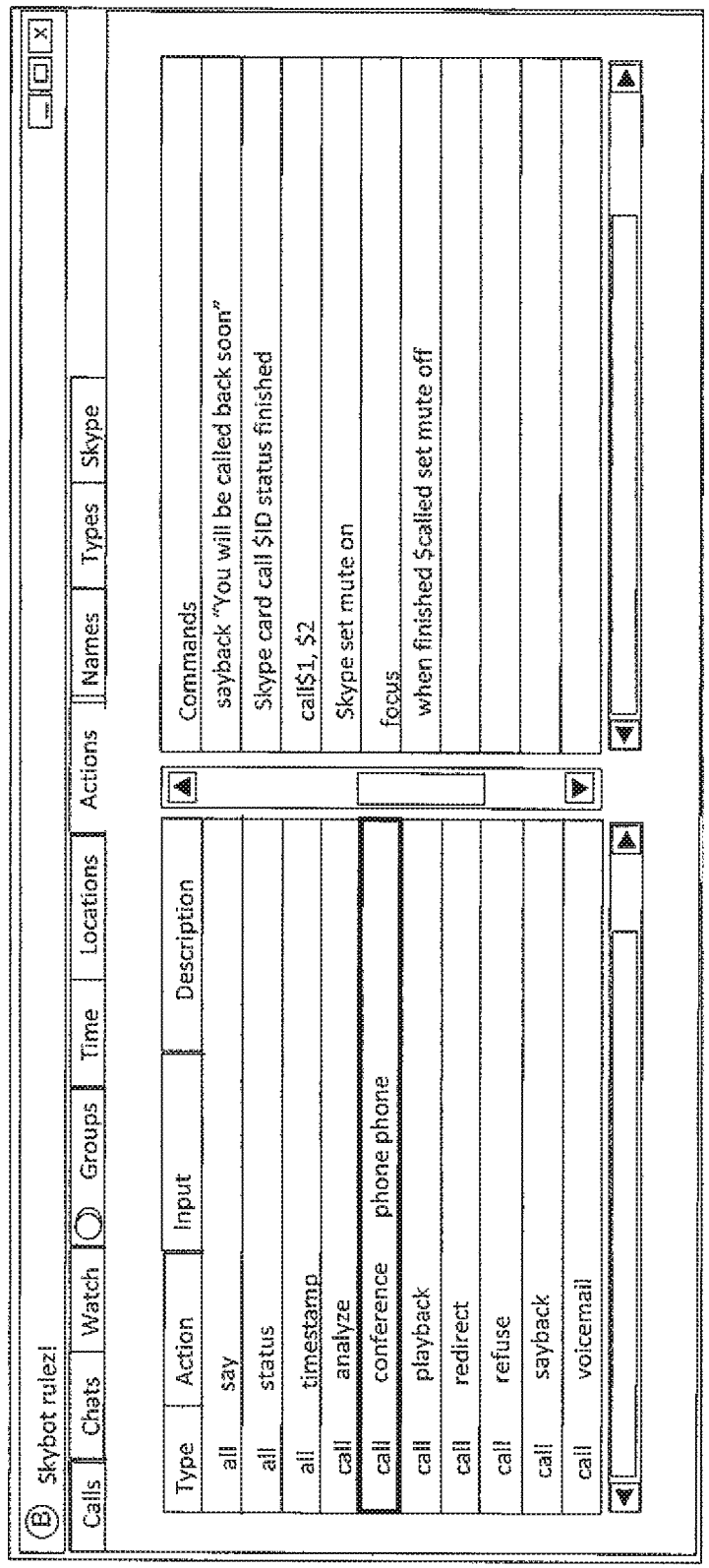
FIG. 4 depicts an example embodiment of a spreadsheet-type interface for defining actions.

FIG. 4 depicts an example embodiment of a spreadsheet-type interface for defining actions. In FIG. 4 the "Actions" tab is selected. In particular the action "conference" is shown. The type field for "conference" is "call" which means that the "conference" action can be used when creating "call" rules (e.g., as described above with reference to FIG. 2).

The "Action" interface includes a left pane having columns defining type, action name, input and description of a specific action and a right pane that lists the commands that are run for a specified action.

Note that there are rules that apply to calls, chats, watches and to all events. In the above example, you can see the Tcl commands that are run when the event is detected. These make use of some pre-defined Tcl commands but the intention is to eventually allow definition of arbitrary Tcl procedures in the database as well.

The "when" command creates a Tcl trace on the call status variable, allowing event driven actions within rules. This means that the rules will be re-evaluated whenever the call status is changed by Skype.

The Details variable is passed in from the call/chat/watch rule, and will be substituted, so that any variables it contains will be expanded. This will allow rules to be parameterized. The following example would be useful in an organization that spans time zones, or where team-members are semi-nocturnal.

| Who | When | Action | Details |
| --- | --- | --- | --- |
| corporate-* | night | reply | "$firstname, I'm still sleeping" |

Because rules and actions are just data stored in database tables, the interface software tool is both flexible and extensible, and can be extended by adding new rows to the tables in the database, or by modifying existing rows.

Examples of Call actions include the following:

| | |
| --- | --- |
| accept | accept the call |
| refuse | don't answer call |
| message | send Instant Message to either the user, the caller or both via an IM gateway |
| reply | reply to caller with pre-defined chat message |
| mail | send mail to me/caller/whoever |
| play | play sound clip to audio output device or caller |
| say | "speech to text" to audio output device or caller |
| voice mail | send call to voice mail |

-continued

| | |
|---|---|
| log | log call details (start time, then end time) |
| conference | hang up call then initiate conference call with pre-defined numbers |
| redirect | hangs up call, then initiates conference with |
| mute | mute speakers |

For example, to refuse all incoming calls when in a meeting, but let Mike know that the user is available via chat, use something like the following Calls definitions (abbreviated for clarity).

| Who | When | Action | Details |
|---|---|---|---|
| all | morning | refuse | |
| mike | morning | Reply | I'm available via chat |
| default | morning | Reply | I'm unavailable |

The "default" rule will only match if there is no other matching response. In this case Mike would see "I'm available via chat" but everyone else would see "I'm unavailable".

Note that there are a set of pre-defined variables available, corresponding to the call properties obtained from Skype (e.g. the above $pstn_number).

The derivation of the commands to execute involves a join of the calls/chat/watch table with the Groups, Time, Location and Action table, then a substitution of variables in the Commands field of the action table.

Examples of Chat actions (when a new chat session starts) are:

| | |
|---|---|
| reply | reply with pre-defined chat message |
| call | forward chat message to call, via text to speech program like t2s |
| mail | forward message via mail |
| message | send the user an Instant Message via an IM gateway |
| proxy | proxy the entire chat session to another IM system |
| play | play sound clip to audio output device |
| say | "speech to text" to audio output device |
| confirm | display a confirm dialog that allows the user to accept or reject the chat |
| log | log call details (start time, then end time) |

Examples of Watch actions (when someone's status changes to a particular state) are:

| | |
|---|---|
| mail | send mail to me/caller/whoever |
| play | play sound clip to speakers and/or caller |
| say | "speech to text" to audio output device |
| call | call the user and play a text to speech file or sound clip |
| message | send an IM via the IM gateway |
| status | change the user's status |

For example, to set the user's status to Offline when idle during prime time (to prevent the super-node-based bandwidth borrowing described above) and to Invisible (to allow Skype proxying) when idle during non-prime time use the following (this would override the default screensaver-based idle behavior).

| Who | When | Status | Action |
|---|---|---|---|
| $me | prime | screensaver | Offline |
| $me | offpeak | screensaver | Invisible |

Note the "me" variable will always expand to the current username.

The Skype API provides a mechanism for third party scripts, applications, and devices to control Skype UI functions and implement additional or improved features to complement Skype.

The Skype API has two layers: a Communication Layer which is a set of methods for external applications, to establish connection to the Skype client and communicate with it, and a Command Protocol Layer, which is a text-based "language" that external applications can use to speak to the Skype client, once a communication channel is established by the Communication Layer.

Additionally, there are several Skype API wrapper libraries that encapsulate the functionality of the Skype API. Such wrappers can act as optional third layers.

The Communication Layer provides a mechanism for external application to communicate with Skype. This layer is platform-dependent, and the transport mechanism to exchange data with Skype is different on Windows, Linux and Mac operating systems.

There are two types of information available to the interface software tool via the Skype API: data that is "pushed" from Skype to the interface software tool when certain events occur, and data that may be "pulled" by the interface software tool from Skype when required.

Messages "pushed" from Skype to the interface software tool include, in part, notification of an incoming call or chat message, the chat topic, the call duration on completion or a call failure reason if there was a problem, but all data may potentially be pushed by Skype and so must be recognized by interface software tool.

Data that may be "pulled" by the interface software tool includes information about the call or chat message, e.g., when an incoming call is detected the interface software tool needs to pull information about the call type and the caller ID.

Figure 5A:
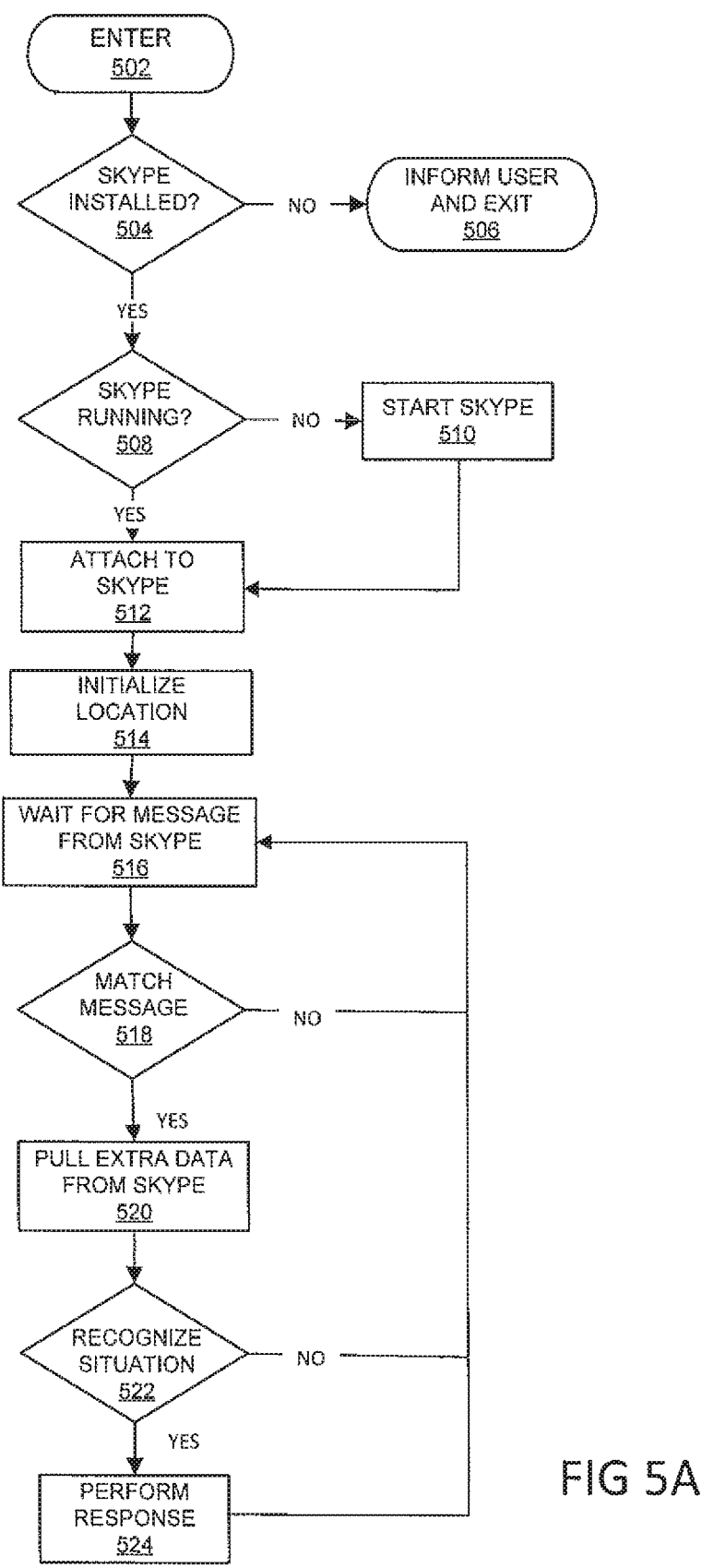

FIG. 5A is an overview of the interaction between the interface software tool and the Skype interface in an example embodiment. Referring to FIG. 5A, in process block 502, a Skype API interaction routine of the interface software tool is entered.

In process block 504-510 the interface software tool checks if Skype is running and (if necessary) starts it. In process block 512 the interface software tool attaches itself to Skype, and registers to receive messages from Skype via the Skype API.

In process block 514, the location is initialized. If the user's location cannot be automatically recognized by using the IP address, the user will be prompted (e.g. home, office, etc.) and information received will be saved. The extensible design of the interface software tool allows for additional location methods to be incorporated, such as using RFID or GPS devices.

The interaction routine then enters a loop where messages from Skype will be recognized and the appropriate response will be performed. In process block 516, the interaction routine waits for a message from Skype. As specified by the Skype API definition, each of the messages from Skype is either: a command (from the interface software tool to Skype) and a corresponding response (from Skype to the interface software tool) or a notification (a "pushed" message from Skype to the interface software tool). These messages are textual messages like "CALL" or "CHAT" followed by additional information, e.g. "CALL 25069 STATUS RINGING".

The interface software tool contains rules that map between Skype API messages and internal interface software tool commands. These rules may be viewed and maintained by the user through the Skype tab on the interface software tool UI, thus allowing users to extend the interface software tool if required. In process block 518, when a notification message is sent from Skype to the interface software tool the message is matched against the list of patterns in the interface software tool's Skype tab.

When there is an incoming call Skype sends the interface software tool a message like the following CALL $id STATUS RINGING where $id is the Skype message identifier. The pattern matching recognizes the message and calls the command "call $id $property $value", where property is STATUS and value is RINGING.

The call procedure sees that there is not an existing call $id, and so creates a new one, creating a separate interpreter to hold its state.

In process block 520 the interface software tool then pulls any required extra data from Skype (e.g., the PARTNER_HANDLE property which contains the Skype username of the incoming call) which is extracted and stored within the interface software tool.

For example, the interface software tool then requests extra information about the call from Skype, such as the Caller ID, e.g. "GET CALL 25069 PARTNER_HANDLE" and Skype returns this information as a response, e.g. "CALL 25069 PARTNER_HANDLE+61812345678", which is again matched against the Skype rules in the interface software tool.

If there is no match then processing returns to process block 516.

In processing block 522, the data pulled from Skype and the data previously pushed from Skype are used to recognize a situation defined by the user when creating a rule. The recognition process will be described more fully below with reference to FIG. 5B.

In process block 524, the appropriate rule-defined response based on the recognized situation is performed.

The RECOGNIZE SITUATION (522) and PERFORM RESPONSE (524) process blocks of FIG. 5A will now be described more fully with reference to FIG. 5B and FIG. 5C respectively. These subroutines match the information obtained from Skype to the rule characteristics, defined for example as described above with reference to FIGS. 2-4, and if a match occurs, the interface software tool performs the action specified in the rule.

Figure 5B:
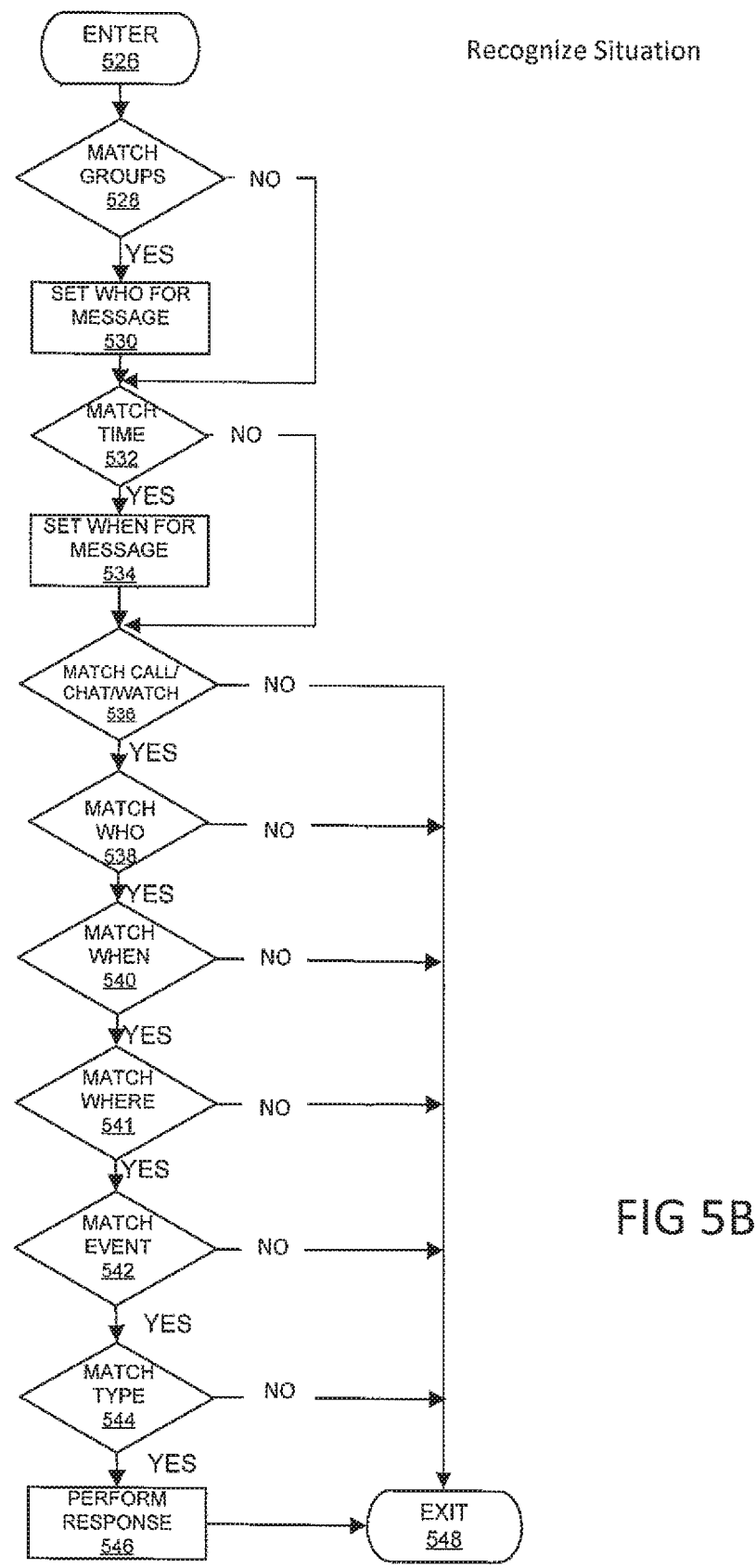

Turning to FIG. 5B, in process block 526 the recognition subroutine is entered. At this point the interface software tool knows several pieces of information about the call or chat, such as the person or number the incoming call/chat came from, the time of day the call/chat arrived, and where the user is currently located.

In process blocks 528-534 this information is further processed according to the rules in the Groups and Time tabs. In process block 528 the "Who" value (that is, the person or number making a call or chat) is first matched against the Groups tab, allowing rules to be specified for multiple people for brevity. Default rules exist for "all" and "friends" (i.e. Skype friends). In process block 530 "Who" is set for the message.

In process block 532 the "Time" value is matched against a range of times, such as morning, night, afternoon, and so on, these can be modified by the user as required. In process block 534 "When" is set for the message.

Once the extra processing defined in process blocks 528-534 occurs, the recognition subroutine has all it needs to recognize a situation and decide on an appropriate response. In process blocks 536-544 searches are made through enabled rules to match characteristics of the received message to characteristics of enabled rules.

In process block 536 the type of call (call, chat, watch) is matched, in process block 538 who made the call is matched, in process block 540 when the call was made is matched, in process block 541 where the user is located is matched, in process block 542 the type of event (ringing, connection, finish) is matched and in process block 544 the direction of the call or chat (incoming, outgoing) is matched.

Once the matching process determines the "situation" defined by an enabled rule then the action defined in the enabled rule is performed in process block 546 and the subroutine exits in process block 548.

The response operation will now be described in more detail with reference to FIG. 5C. When a situation is recognized (i.e. a rule in the Calls, Chats or Watch tab matches) the associated action is run by the interface software tool. Actions are specified in the Action tab, and can be modified or extended by users using a spreadsheet paradigm as described above with reference to FIGS. 2-4.

Actions can relate to either calls, chats, watches or all three, are named (e.g. mail, message, mute) and may have one or more corresponding commands within the interface software tool. Commands can be Skype commands, interface software tool commands or any arbitrary command to be run on the computer hosting Skype. This allows the situation-specific combination of arbitrary Skype and non-Skype functionality The Actions tab specifies optional information that is passed to the action by the interface software tool, as per the Details information associated with each entry in the Calls, Chats and Watch tabs.

The Input column in the Actions tab specifies the optional information expected by each action. For example, the mail action expects three pieces of information—the email addressee, the subject (a text value) and the contents of the message (another text value).

Many different default actions can be appropriate for calls and chats, including, for example, to accept the incoming call/chat, refuse the call, respond using a speech to text subsystem, send to voice mail, redirect to another number, or initiate a conference call.

As depicted in FIG. 4, corresponding to each entry in the actions tab is a list of the command(s) to be run to implement the response.

By way of example, FIG. 5C illustrates the interaction between Skype and the interface software tool via the Skype API when performing the "conference" action depicted in FIG. 4. The "conference" action can be specified to automatically set up a conference call between designated parties when a particular set of characteristics are matched from an incoming message.

In this example, the conference call action accepts two inputs, both phone numbers for the conference call attendees, and gets response data from the database in process steps 550-554, and then performs six steps in responding.

In process block 556 the response subroutine instructs the interface software tool to convert the message "You will be called back soon" from text to speech, and instructs Skype to play the sound to the originating caller.

In process block 560 the response subroutine instructs Skype to HANG UP CALL and in process block 562 Skype finishes the call.

In process block 564 the response subroutine instructs Skype to CALL NUMBERS and utilizes the numbers obtained in process blocks 550 and 552. In process blocks 566 and 568 Skype calls the two conference call attendees. In this example, one would be the original caller and one would be the interface software tool user's cell phone number.

In process block 570 the response subroutine instructs Skype to MUTE SPEAKERS and in process block 572 Skype itself is muted so that no sound comes from the speakers during the call.

In process block 574 the response subroutine gives Skype "focus" so that Skype is brought to the front on the computer running the interface software tool so that it is apparent a conference call is in progress.

In process blocks 576-580 the response subroutine waits for the call to finish and, when the call finishes, Skype is un-muted. The response subroutine exits at process block 582.

Figure 6:
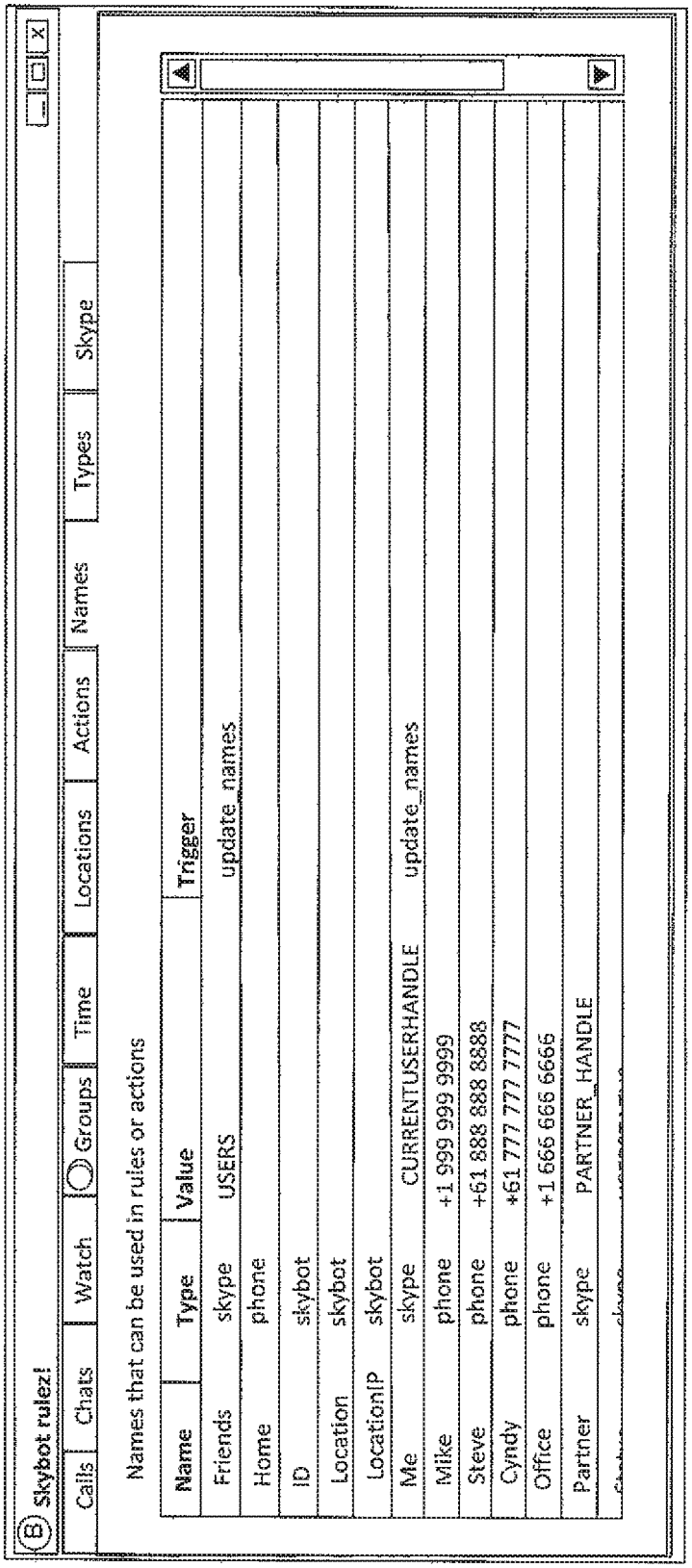
FIG. 6 depicts an example embodiment of a spreadsheet-type interface for defining names.

FIG. 6 depicts a spreadsheet-type interface for defining names. In FIG. 6 the "Names" tab is selected and each row defines a name. The column tabs are labeled Name, Type, Value and Trigger.

There are a number of different types of variables supported:

| Type | Description |
|---|---|
| text | arbitrary textual value |
| phone | an international phone number - 11 digits of the of the form "+nn nn nnn nnnn" or "+n nnn nnn nnnn" |
| email | text of the form "user@host.domain" |
| Skype | a Skype variable (as per Skype API docs) |
| website | a web url |
| url | a general url |
| file | a file on the local host, using the Tcl file conventions (e.g. C:/wherever/whatever) |

The variable types are defined in the Types tab using Tcl expressions, similar to as shown in FIG. 7. The reformat column specifies if the Tcl command returns a value that should replace the original value (useful, for example, when forcing phone numbers to a standard format). The Trigger specifies the name of a Tcl command to call whenever the Value of a Name changes. This allows for Watch rules to be triggered by changes pushed from Skype.

FIG. 7 depicts a spreadsheet-type interface for defining variable types. In FIG. 7 the "Types" tab is selected. The variable types are defined in the Types tab using Tcl expressions. The reformat column specifies if the Tcl command returns a value that should replace the original value (useful, for example, when forcing phone numbers to a standard format).

The Skype tab exposes the internal mapping from Skype messages to the interface software tool Tcl commands that parse them and invoke the state engine.

To define a Skype variable the following is specified:

| type | the type of variable |
|---|---|
| property | the Skype property/variable name |
| pattern | pattern to match on |
| postprocess | Tcl commands to post-process the value after retrieving it from Skype |
| pull | list of other data to pull when push is detected |

The embodiments described above allow an unlimited amount of additional functionality to be defined by the user including, for example, rules to: call back when current call finishes, send chat message when current call finishes, change the Skype icon when on a call, initiate conference call, send call to voice mail, refuse a call, accept a call, reply via chat and send an SMS via smsgateway service.

There are many additional actions that can be specified to route incoming calls in specific ways, such as actions based on the identity of the caller and/or the time of day or day of the week.

Many simple practical solutions are possible using this approach, such as, during off hours, routing calls from a client to a work voice mail system, routing calls from the user's spouse to go to the user's cell phone, and causing calls from a manager to trigger an email alert to be sent to the user's PDA.

But the potential exists for unlimited types of creative automation as well. For example, if a user wished to appear to others to be present at her machine, even if she was not, then rules could be specified to keep the user's online status looking as if she were at the machine, periodically switching it between "online" and "away". Perhaps, if someone were to send a chat message during this time, the interface software tool could initiate a conversation between the user and the sender and a customized Eliza engine could simulate the user's presence by sending plausible yet non-committal chat responses that make it appear that the user were present at the machine.

Figure 8:
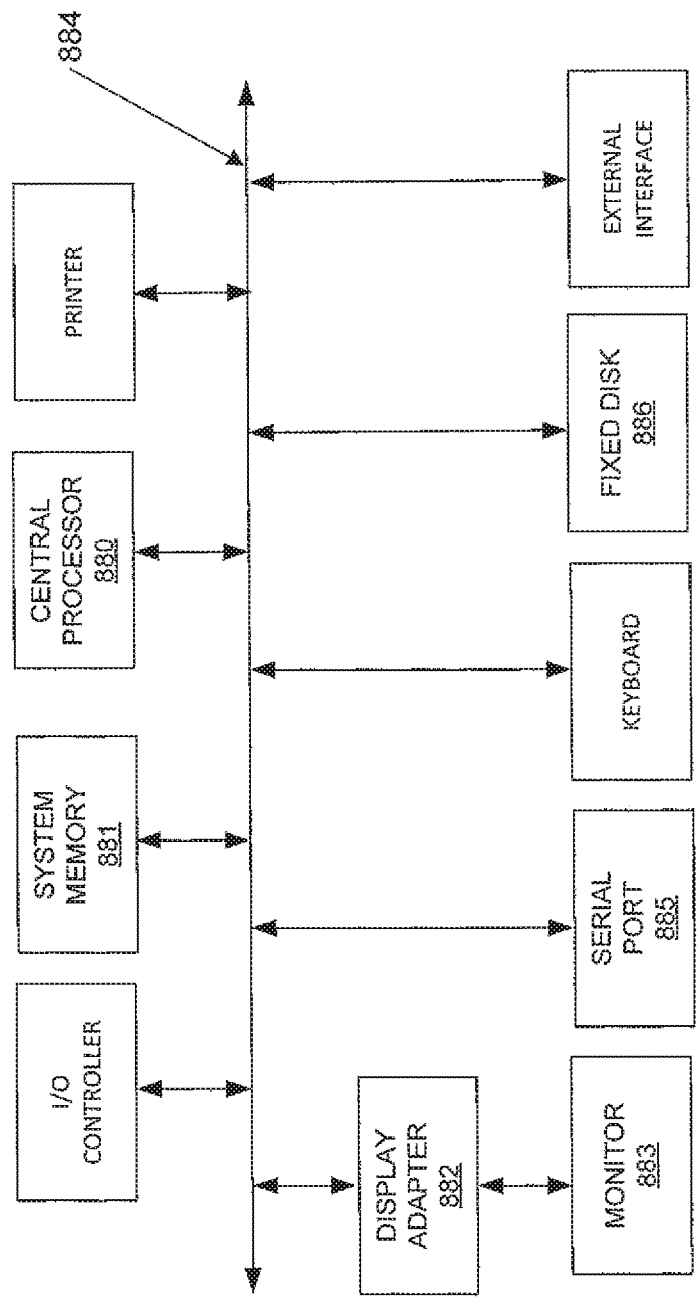
FIG. 8 is a block diagram of an example computer system in which embodiments can operate.

FIG. 8 is an illustration of basic subsystems in a computer system workstation. In FIG. 8, subsystems are represented by blocks such as central processor 880, system memory 881 including random access memory (RAM) and/or read-only memory (ROM), display adapter 882, monitor 883, etc. The subsystems are interconnected via a system bus 884. Additional subsystems such as a printer, keyboard, fixed disk and others are shown. Peripherals and input/output (I/O) devices can be connected to the computer system by, for example serial port 885. For example, serial port 885 can be used to connect the computer system to a modem for connection to a network or serial port 885 can be used to interface with a mouse input device. The interconnection via system bus 884 allows central processor 880 to communicate with each subsystem and to control the execution of instructions from system memory 881 or fixed disk 886, and the exchange of information between subsystems. Other arrangements of subsystems and interconnections are possible.

The modules depicted in FIG. 1 could be implemented as software modules in the system memory 881 to be executed by a processor or be implemented as combinations of program code and hard-wired logic.

Various example embodiments have been described above. Alternatives and substitutions will now be apparent to persons of skill in the art. For example, embodiments of the invention could be used with any telecommunication system or chat system having an API allowing control by an external application. Such systems include, for example, Google Voice, AIM or Yahoo Messenger. Accordingly, it is not intended to limit the invention except as provided by the appended claims.

The invention is claimed as follows:

1. An apparatus comprising:
   one or more computer processors; and
   one or more memory devices having encoded logic for execution by the one or more computer processors, which when executed causes the one or more computer processors to:
   receive a chat or voice message type communication from a first device operable by a first person;

access at least one first computational resource to recognize content of the received chat or voice message type communication;

access a rule configured to be applied to the received chat or voice message type communication, the rule including an action to perform based at least in part on recognized content of the received chat or voice message type communication;

access at least one second computational resource to apply at least one condition of the accessed rule to the recognized content of the received chat or voice message type communication to determine if the action for the accessed rule should be performed;

access at least one third computational resource to perform the action if the at least one condition of the accessed rule is satisfied, said action including determining a responsive chat or voice message type communication responsive to the received chat or voice message type communication using an artificial intelligence module configured to determine the responsive chat or voice message type communication; and automatically send to said first device said determined responsive chat or voice message type communication to simulate conversation between a second person and the first person.

2. The apparatus of claim 1, wherein the satisfaction of the at least one condition of the accessed rule is due at least in part to information useable to determine at least part of at least one of the first person's context and of the second person's context.

3. The apparatus of claim 2, wherein the part of the at least one of the first person's context and of the second person's context relates to a geographical location.

4. The apparatus of claim 2, wherein the part of the at least one of the first person's context and of the second person's context relates to a date or a time of day.

5. The apparatus of claim 2, wherein the part of the at least one of the first person's context and of the second person's context relates to a respective need of at least one of the first person and the second person.

6. The apparatus of claim 2, wherein the part of the at least one of the first person's context and of the second person's context relates to a respective activity being engaged in by at least one of the first person and the second person.

7. The apparatus of claim 6, wherein the activity is one which at least one of the first person and the second person desires not to be interrupted.

8. The apparatus of claim 1, wherein the at least one first computational resource, the at least one second computational resource, and the at least one third computational resource are a same computational resource.

9. The apparatus of claim 1, wherein two of the at least one first computational resource, the at least one second computational resource, and the at least one third computational resource are a same computational resource.

10. An apparatus comprising:
one or more computer processors; and
one or more memory devices having encoded logic for execution by the one or more computer processors, which when executed causes the one or more computer processors to:
send an initial chat or voice message type communication;
receive a chat or voice message type communication from a first device operable by a first person;
access at least one first computational resource to recognize content of the received chat or voice message type communication;

access a rule configured to be applied to the received chat or voice message type communication, the rule including an action to perform based at least in part on recognized content of the received chat or voice message type communication;

access at least one second computational resource to apply at least one condition of the accessed rule to the recognized content of the received chat or voice message type communication to determine if the action for the accessed rule should be performed;

access at least one third computational resource to perform the action if the at least one condition of the accessed rule is satisfied, said action including determining a responsive chat or voice message type communication responsive to the received chat or voice message type communication using an artificial intelligence module configured to determine the responsive chat or voice message type communication; and automatically send to the first device said determined responsive chat or voice message type communication to simulate conversation between a second person and the first person.

11. The apparatus of claim 10, wherein the satisfaction of the at least one condition of the accessed rule is due at least in part to information useable to determine at least part of at least one of the first person's context and of the second person's context.

12. The apparatus of claim 11, wherein the part of the at least one of the first person's context and of the second person's context relates to a geographical location.

13. The apparatus of claim 11, wherein the part of the at least one of the first person's context and of the second person's context relates to a date or a time of day.

14. The apparatus of claim 11, wherein the part of the at least one of the first person's context and of the second person's context relates to a respective need of at least one of the first person and the second person.

15. The apparatus of claim 11, wherein the part of the at least one of the first person's context and of the second person's context relates to a respective activity being engaged in by at least one of the first person and the second person.

16. The apparatus of claim 15, wherein the activity is one which at least one of the first person and the second person desires not to be interrupted.

17. The apparatus of claim 10, wherein the at least one first computational resource, the at least one second computational resource, and the at least one third computational resource are a same computational resource.

18. The apparatus of claim 10, wherein two of the at least one first computational resource, the at least one second computational resource, and the at least one third computational resource are a same computational resource.

19. A communication device comprising:
a memory;
a data processor coupled to the memory;
a voice input subsystem;
an audio output subsystem; and
communications subsystems for at least voice type communications and chat message type communications, the communication device configured to:

(A) send at least chat or voice message type communications from a first person via the Internet to a server, the server configured to:
  (a) receive communications via the Internet,
  (b) perform actions responsive to the communications received, and
  (c) send responsive communications via the Internet, wherein the server includes:
  at least one processor; and
  at least one memory device that stores a plurality of instructions, a list of commands and a plurality of different rules, each rule invocable as a result of detection of at least one of a plurality of different event characteristics, wherein the execution of the code associated with the detected event characteristic is caused by the invocation of at least one of the rules, and wherein the plurality of instructions, when executed by the at least one processor, enables the server to:
    i. exchange communications via the Internet with the communication device; and
    ii. provide:
      (a) a server communications subsystem configured to exchange at least chat or voice message type communications via the Internet with the communication device,
      (b) a response component, and
      (c) a server communications monitoring component configured to monitor incoming communications received by the communications subsystem, and for each of a plurality of incoming communications received by the communication subsystem:
        (i) cause the server communications monitoring component to determine if the received communication is of a designated chat or voice message type communication, and if so, in real time detect an event characteristic of the received communication, and
        (ii) cause the response component to use an artificial intelligence module to automatically perform a response action associated with the received communication, the response component responsive in real time to the detected event characteristic of the received communication, and the response component configured to cause execution of code associated with the detected event characteristic of the received communication to simulate conversation between a second person and the first person, wherein the execution of the code causes the server to at least send a responsive chat or voice message type communication responsive to the received communication via the Internet to the communication device;
(B) receive the responsive chat or voice message type communication via the Internet from the server; and
(C) output the received responsive chat or voice message type communication to facilitate simulation of conversation between the second person and the first person.

20. The communication device of claim 19, wherein (a) the server is configured to use natural language recognition operations to process the received communication; and (b) the server includes the artificial intelligence module configured to cause the responsive chat or voice message type communication to simulate conversation between the second person and the first person.

21. The communication device of claim 20, which is portable.

22. The communication device of claim 19, wherein the plurality of different event characteristics includes at least: (a) a who telecommunication event characteristic that identifies a source of the received communication detected by the monitoring component; and (b) a when telecommunication event characteristic that identifies a time the received communication was received.

23. The communication device of claim 22, wherein:
  (a) the plurality of different event characteristics includes at least a where telecommunication event characteristic that identifies information related to a location of a source of the received communication detected by the monitoring component;
  (b) the detected event characteristic configured to be pushed by the communication subsystem to the communication monitoring component, the event characteristic being one of the who telecommunication event characteristic and the when telecommunication event characteristic;
  (c) the server is further configured to invoke at least part of the list of commands to pull any additional required event characteristics of the received communication from the communications subsystem;
  (d) the server is further configured to invoke at least part of the list of commands to compare the pushed and any additional pulled required event characteristics to event characteristics included in the stored rules to determine whether the pushed and any required pulled event characteristics match a situation included in one of the stored rules; and
  (e) the server is further configured to invoke at least part of the list of commands to transmit in real time to the communication device the responsive chat or voice message type communication.

24. The communication device of claim 23, which is portable.

25. The communication device of claim 24, which includes a text input mechanism, a graphic display, and a communications subsystem for email message type communications.

26. The communication device of claim 22, which is portable.

27. The communication device of claim 19, which is portable.

28. A method of operating an apparatus including one or more computer processors and one or more memory devices having encoded logic for execution by the one or more computer processors, said method comprising:
  receiving a chat or voice message type communication from a first device operable by a first person;
  accessing at least one first computational resource to recognize content of the received chat or voice message type communication;
  accessing a rule configured to be applied to the received chat or voice message type communication, the rule including an action to perform based at least in part on recognized content of the received chat or voice message type communication;
  accessing at least one second computational resource to apply at least one condition of the accessed rule to the recognized content of the received chat or voice message type communication to determine if the action for the accessed rule should be performed;

accessing at least one third computational resource to perform the action if the at least one condition of the accessed rule is satisfied, said action including determining a responsive chat or voice message type communication responsive to the received chat or voice message type communication using an artificial intelligence module configured to determine the responsive chat or voice message type communication; and automatically sending to the first device said determined responsive chat or voice message type communication to simulate conversation between a second person and the first person.

29. The method of claim 28, wherein the satisfaction of the at least one condition of the accessed rule is due at least in part to information useable to determine at least part of at least one of the first person's context and of the second person's context.

30. The method of claim 29, wherein the part of the at least one of the first person's context and of the second person's context relates to a geographical location.

31. The method of claim 29, wherein the part of the at least one of the first person's context and of the second person's context relates to a date or a time of day.

32. The method of claim 29, wherein the part of the at least one of the first person's context and of the second person's context relates to a respective need of at least one of the first person and the second person.

33. The method of claim 29, wherein the part of the at least one of the first person's context and of the second person's context relates to a respective activity being engaged in by at least one of the first person and the second person.

34. The method of claim 33, wherein the activity is one which at least one of the first person and the second person desires not to be interrupted.

35. The method of claim 28, wherein the at least one first computational resource, the at least one second computational resource, and the at least one third computational resource are a same computational resource.

36. The method of claim 28, wherein two of the at least one first computational resource, the at least one second computational resource, and the at least one third computational resource are a same computational resource.

37. The method of claim 28, which includes sending an initial chat or voice message type communication before receiving the received chat or voice message type communication.

* * * * *